United States Patent [19]

Yoshimura et al.

[11] Patent Number: 5,169,731
[45] Date of Patent: Dec. 8, 1992

[54] SOLID OXIDE FUEL CELL AND METHOD FOR MANUFACTURING THE SAME

[75] Inventors: Takayoshi Yoshimura; Toshio Arai; Masaki Sato, all of Toyama, Japan

[73] Assignee: Yoshida Kogyo K. K., Tokyo, Japan

[21] Appl. No.: 810,537

[22] Filed: Dec. 19, 1991

Related U.S. Application Data

[63] Continuation of Ser. No. 687,635, Apr. 19, 1991, abandoned.

[30] Foreign Application Priority Data

Apr. 24, 1990 [JP] Japan ................................. 2-106610

[51] Int. Cl.$^5$ .............................................. H01M 8/10
[52] U.S. Cl. .......................................... 29/30; 429/32; 427/115; 29/623.1
[58] Field of Search .................. 429/30, 31, 32, 191, 429/192; 29/623.1; 427/115

[56] References Cited

U.S. PATENT DOCUMENTS

| | | | |
|---|---|---|---|
| 3,460,991 | 8/1969 | White, Jr. ................................. 429/30 |
| 3,492,165 | 1/1970 | Guillot et al. . | |
| 3,525,646 | 8/1970 | Tannenberger et al. . | |
| 3,784,415 | 1/1974 | Hopkins . | |
| 4,476,197 | 10/1984 | Herceg .................................. 429/32 |
| 4,799,936 | 1/1989 | Riley .................................... 29/623.1 |

FOREIGN PATENT DOCUMENTS 0361383  4/1990  European Pat. Off. .
1935973  3/1970  Fed. Rep. of Germany .
2347783  11/1977  France .

OTHER PUBLICATIONS

Patent Abstracts of Japan, vol. 13, No. 295 (E-783) 3643, Jul. 7, 1989.

*Primary Examiner*—Anthony Skapars
*Attorney, Agent, or Firm*—Hill, Van Santen, Steadman & Simpson

[57] ABSTRACT

In a solid oxide fuel cell, a multiplicity of single cells are arranged one on each of multiple hollow portions, each single cell including confronting inner and outer electrodes separated by a solid electrolyte. The individual single cells are interconnected in series by multiple interconnections each extending from the inner electrode, at its portion contiguous to the substrate, of the respective one single cell to the outer electrode of the adjacent single cell through the electrolyte of the respective one single cell.

17 Claims, 7 Drawing Sheets

SOLID OXIDE FUEL CELL AND METHOD FOR MANUFACTURING THE SAME

This is a continuation of application Ser. No. 687,635 filed Apr. 19, 1991, now abandoned.

BACKGROUND OF THE INVENTION

1. Field of the Invention

This invention relates to a solid oxide fuel cell that converts chemical potential directly into electric energy, thus generating electric power, and also to a method for manufacturing such a solid oxide fuel cell.

2. Description of the Related Art

It is currently known that single cells of solid oxide fuel cell are constructed of inner electrode, electrolyte and outer electrode on the annular porous substrate tube. A interconnection extends from a predetermined section of the inner electrode for each respective single cell through the associated outer electrode and electrolyte. The inner electrode for a single cell is connected in series with the outer electrode for an adjacent single cell by the interconnection of single cell-via a metallic felt. This prior art is exemplified by Japanese Patent Laid-Open Publication No. 130381/1982.

In putting a solid oxide fuel cell to practical use, it has hitherto been a significant aim to improve the efficiency of generating electric power; various studies have therefore been made to reduce the cell thickness to a minimum. In one of these studies, the thickness of the porous support tube, which serves to supply fuel gas to the electrodes, is reduced in an effort to more efficiently discharge the product of reaction and introduce the fuel gas to the electrodes, both of which are believed to be useful in improving the efficiency of generating electric power.

In the prior solid oxide fuel cell, however, partly since the electrodes, the electrolyte, the interconnections, etc. must be supported on the porous support tube, and partly since one single cell connected therewith in parallel or in series must be supported at the other single cell via a metallic felt, the thickness of the support tube must be thick enough to have a sufficient degree of strength and durability. It is also necessary to connect cells in parallel or in series via the metallic felt. Consequently assembling of the solid oxide fuel cell is difficult to achieve.

SUMMARY OF THE INVENTION

It is therefore an object of this invention to provide a solid oxide fuel cell which is easy to assemble and in which a dense substrate holds single cells so that the thickness of support part is thinned with the reduction of strength for the support part, thus improving the efficiency of generating electric power.

Another object of the invention is to provide a method of manufacturing the solid oxide fuel cell described in the previous paragraph.

According to a first aspect of the invention, there is provided a solid oxide fuel cell comprising: a substrate having at least one hollow portion; a multiplicity of single cells disposed on the hollow portion of the substrate, each of the single cells including confronting inner and outer electrodes with an electrolyte disposed between them; and a multiplicity of interconnections connecting the single cells in series, and also to connect the inner electrode of one single cell to the outer electrode of an adjacent single cell, through the electrolyte of the respective single cell. A multiplicity of porous support parts may each be located between an inner surface of each single cell and the associated hollow portion.

Specifically, the substrate is dense in structure and hence gastight. The substrate is an insulator, such as alumina, a stabilized or partially-stabilized zirconia, or a mixture thereof. The porous support part is preferably made of a porous ceramics, which has open pores, such as alumina, a stabilized or partially-stabilized zirconia, or a mixture thereof.

The interconnection is made of an electrically conductive material which is stable in both an oxidized atmosphere and a reduced atmosphere. The electrically conductive material is exemplified by a perovskite-type oxide, which is $LaCrO_3$ doped with an alkaline earth metal.

The inner or outer electrode, which serves as an anode, is preferably made of Ni-zirconia cermet. The other electrode, which serves as a cathode, is preferably made of $LaCoO_3$ or $LaMnO_3$ doped with an alkaline earth metal. The electrolyte is preferably yttria stabilized zirconia.

Generally in the current technology, the film thickness of the porous substrate is 1.0–2.0 mm; that of the interconnection, 100–200 $\mu$m; that of the electrolyte, 100–200 $\mu$m; and that of each the anode and cathode, 100–200 $\mu$m. In this invention, it is possible to further reduce the thickness of the porous substrate from the described range.

According to a second aspect of the invention, there is provided a method for manufacturing a solid oxide fuel cell, comprising: providing a substrate having at least one hollow portion with or without a porous support part; forming an inner electrode on the hollow portion; forming on the substrate a multiplicity of interconnections each extending from an inner electrode end to a position spaced a predetermined distance from an adjacent single cell position is to be formed; and then forming an electrolyte and an outer electrode on an outer surface of the inner electrode in that order on the hollow portion in such a manner that the outer electrode is connected to each interconnection of the adjacent single cell.

In this method, the inner electrodes, the electrolyte, the outer electrodes and interconnections are made by conventional film fabrication technique such as the dry processing and the wet processing. The dry processing is exemplified by plasma spraying, flame spraying, chemical vapor deposition (CVD) and physical vapor deposition (PVD), while the wet processing is exemplified by the dipping method and the screen printing method. The inner electrodes, the electrolyte, the outer electrodes and the interconnections are formed at their respective predetermined positions by appropriate masking.

The porous support parts are formed by, for example, extrusion pressing and are then sintered. In the absence of the porous support part, the inner electrodes are formed by, for example, extrusion pressing and are then sintered or otherwise. These porous support parts or inner electrodes are attached to the surface of the substrate, whereupon another layer is formed over the resulting surface of the substrate by the previously described film fabrication technique.

Further, the electrolyte and the interconnections must be in dense-structure films, while the inner and outer electrodes must be formed in porous films. For example, the dense-structure films may be formed by plasma spraying, and the porous films may be formed by flame spraying.

The operation of the solid oxide fuel cell will now be described, with the inner and outer electrodes being assumed as an anode and a cathode, respectively. Hydrogen, for example, is supplied to the hollow portion. On the other hand, oxygen, for example, is supplied to the exterior of the cells. The cathode supplies electrons to the electrolyte, introducing oxygen to the surface thereof, and facilitates reaction between electrons and oxygen to produce $O^{2-}$ ions. $O^{2-}$ ions diffuse and migrate to the anode via oxygen vacancies in the electrolyte. Upon arrival at the interface between the electrolyte and the anode, $O^{2-}$ ions eject the electrons to become oxygen. The oxygen reacts with the hydrogen arrived at the interface between the anode and the electrolyte, via the porous support part or directly, from the hollow portion, resulting in the oxygen and hydrogen being converted into water and electric energy being generated. The above and other advantages, features and additional objects of this invention will be manifest to those versed in the art upon making reference to the following detailed description and the accompanying drawings in which several preferred embodiments incorporating the principles of this invention are shown by way of illustrative examples.

DETAILED DESCRIPTION

Figure 1:
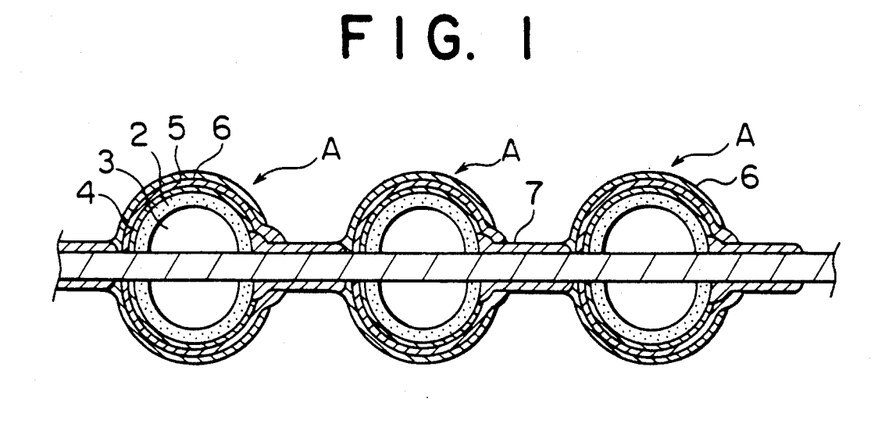
FIGS. 1 through 4 are fragmentary cross-sectional views of different fuel cell stacks according to various embodiments of this invention.

The principles of this invention are particularly useful when embodied in a solid oxide fuel cell (hereinafter also called "fuel cell") such as shown in FIG. 1.

In FIG. 1, which shows a first embodiment, reference numeral 1 designates a 3 mm-thick dense substrate of alumina. The substrate 1 has a multiplicity of single cells A at desired distances. A multiplicity of 0.5 mm-thick porous support part 2 of alumina are disposed one at each of the single cells A so as to form a hollow portion 3 thereat. Over each porous support part 2, a 100 $\mu$m-thick inner electrode 4 of Ni-zirconia cermet, a 100 $\mu$m-thick layer of electrolyte 5 of yttria-stabilized zirconia and a 100 $\mu$m-thick outer electrode 6 of LaMnO$_3$ doped with Sr are laminated over one another to provide each single cell A.

The single cells A are connected in series by a multiplicity of interconnections 7 each extending from the inner electrode 4, at its portion contiguous to the substrate 1, of the associated single cell A to the outer electrode 6 of the adjacent single cell A through the electrolyte 5 of the associated single cell A. In the first embodiment of FIG. 1, the series-connected single cells A at one side of the substrate 1 are the mirror image of those at the other side; that is, the single cells A are arranged in symmetry relative to the substrate 1.

Each hollow portion 3 has a semi-cylindrical contour, and each of the inner electrodes 4 and outer electrodes 6 has a semi-tubular cross section. Also each porous support part 2 has a semi-tubular cross section.

Figure 2:
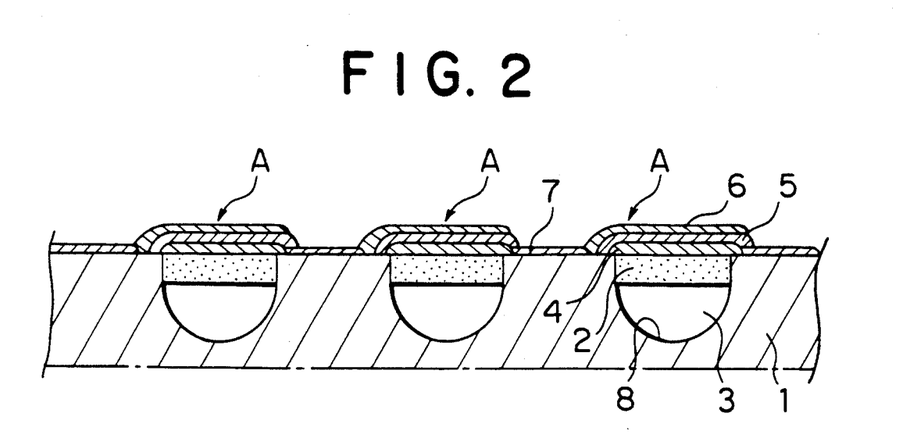

FIG. 2 shows a second embodiment, in which parts or elements similar or corresponding to those of FIG. 1 are designated by the same reference numerals. In this embodiment, the substrate 1 has a multiplicity of recesses 8 for forming each hollow portion 3. A multiplicity of porous support parts 2 are each received in the mouth of each recess 8 so as to form a hollow portion 3. Over each porous support part 2, the inner electrode 4, the electrolyte 5 and the outer electrode 6 are laminated one over another in this order to provide each single cell A. These single cells A are connected by a multiplicity of interconnections 7 each extending from the inner electrode 4 of the associated single cell A to the outer electrode 6 of the adjacent single cell A.

Figure 3:
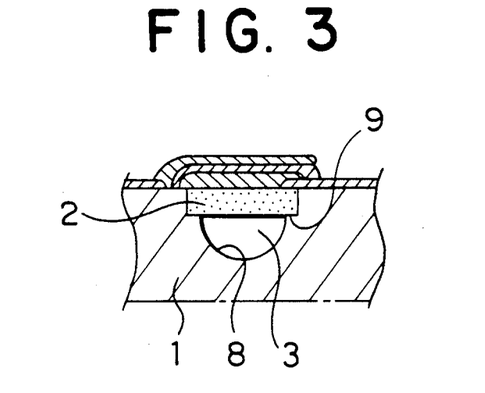

FIG. 3 shows a third embodiment, in which each porous support part 2 is placed on a step 9 in the mouth of the individual recess 8 so that the porous support part 2 can be received in the associated recess 8 with improved stability.

Figure 4:
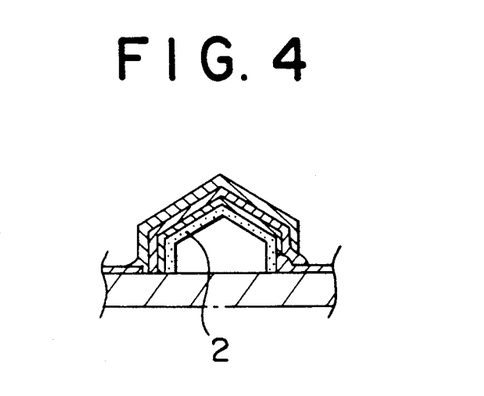

FIG. 4 shows a fourth embodiment, in which each porous support part 2 has a polygonal cross-sectional shape.

Figure 5:
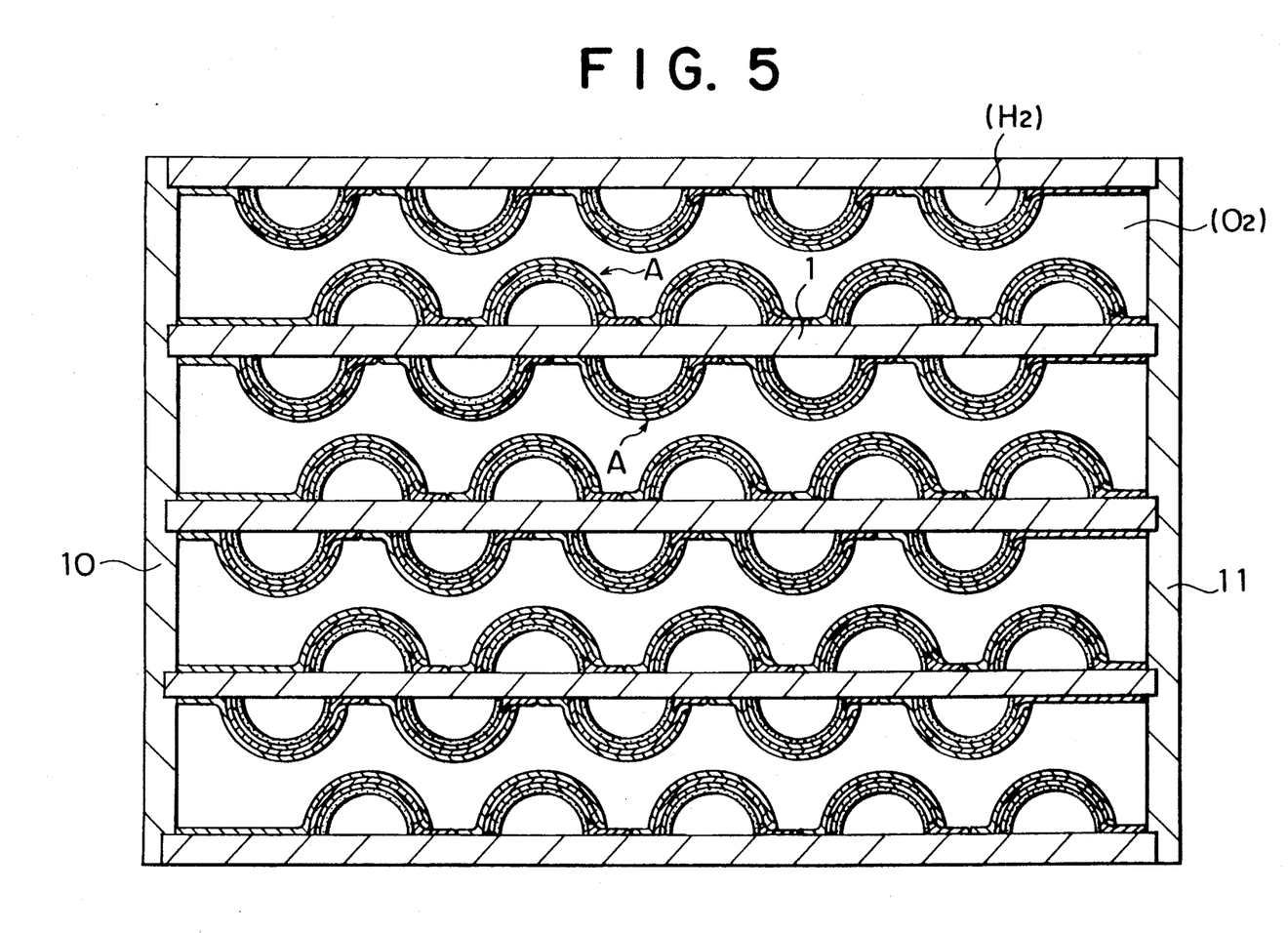
FIG. 5 is a schematic cross-sectional view of a fuel cell module according another embodiment of the invention.

FIG. 5 shows a different-type fuel cell module as a fifth embodiment. In this embodiment, the individual single cells A on opposite sides of each substrate 1 are arranged in stagger, namely, in asymmetry relative to the substrate 1. Each substrate 1 is connected at opposite ends to a cathode collector 10 and an anode collector 11, respectively.

Figure 6:
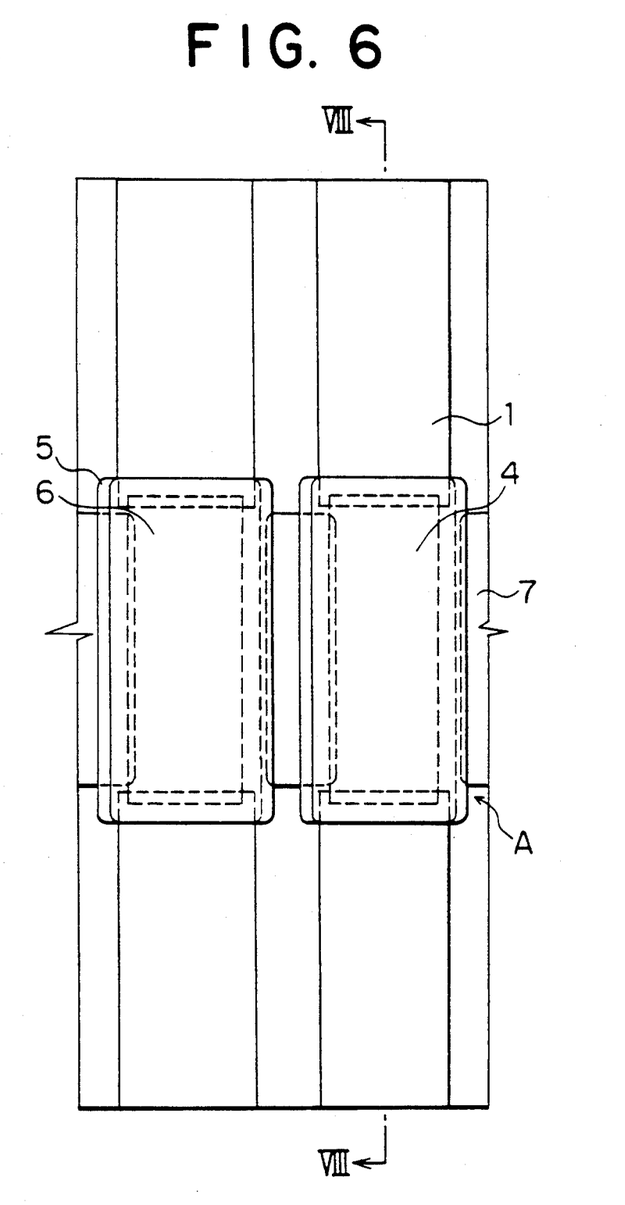
FIG. 6 is a schematic plan view of the fuel cell stack of this invention.
Figure 7:
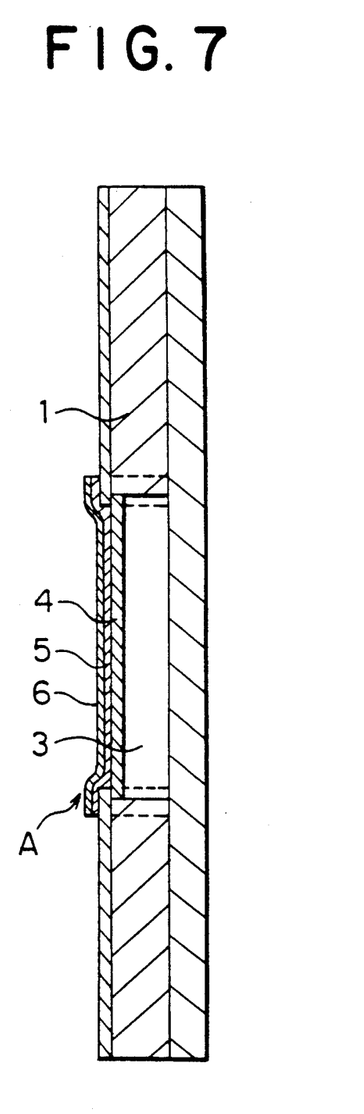
FIG. 7 is a cross-sectional view taken along line VIII—VIII of FIG. 6.

FIGS. 6 and 7 schematically show the overall fuel cell stack of this invention. In production, using alumina as a raw material, a plate-like portion and a multiplicity of semi-cylindrical portions are integrally formed by extrusion. Then a multiplicity of holes are formed at desired distances, namely, one at each prospective single cell A, whereupon a substrate 1 is obtained by sintering. On the substrate 1, a multiplicity of semi-tubular inner electrodes 4 are formed one at each single cell A. A multiplicity of interconnections 7 are also formed on the substrate 1 in such a manner that each interconnection 7 extended from the inner electrode 4 to a position space to a predetermined distance from an adjacent inner electrode 4. In addition, an electrolyte 5 and an outer electrode 6 are laminated over each of the resulting single cells A so that each single cell is connected in series with the adjacent single cell to jointly provide a solid oxide fuel cell.

In the conventional structure using a porous substrate or tube, a dense film is placed over the surface of the non-power-generating portion in an effort to prevent gas flowing in the porous substarate or tube from leakage. Or the non-power-generating portion itself is a separate dense structure joined with the power-generating portion. According to this invention, it is unnecessary to make these measures so that the manufacturing steps to be associated with such measures can be omitted.

Figures 8, 9:
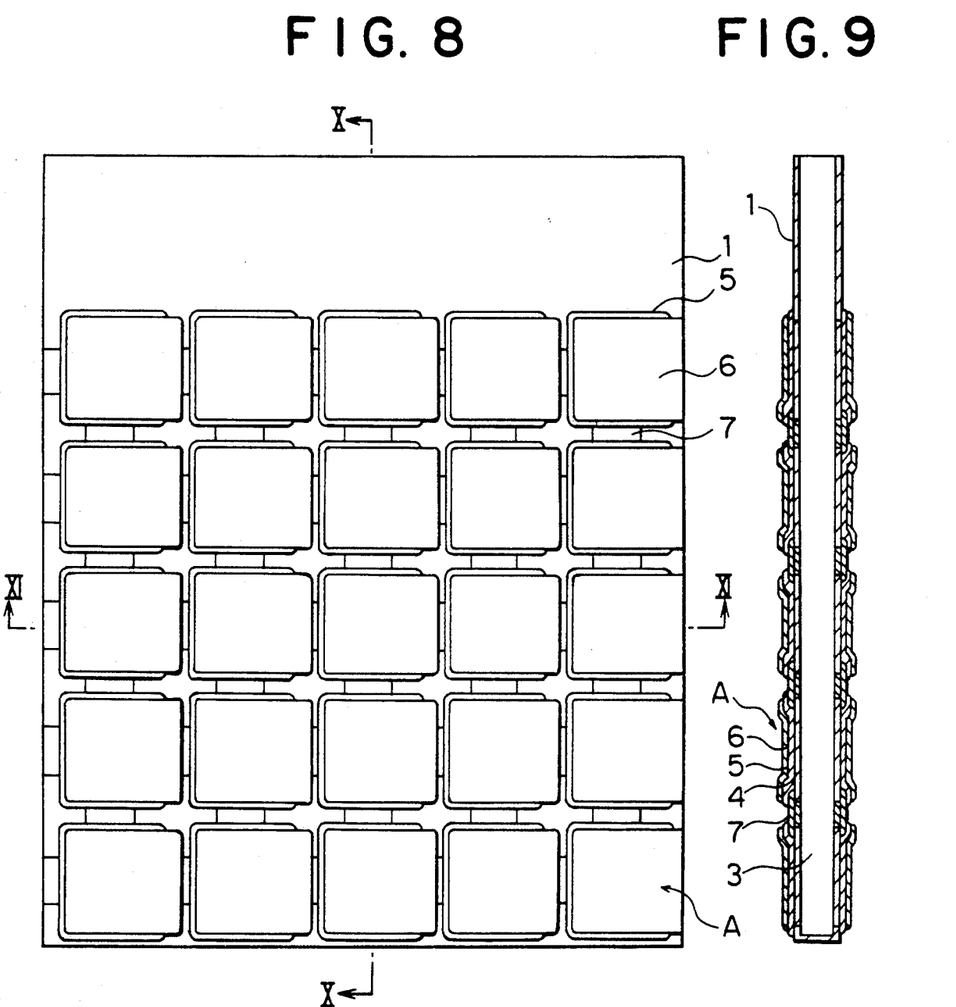
FIG. 8 is a fragmentary plan view of a further modified fuel cell stack according to still another embodiment.
FIG. 9 is a cross-sectional view taken along line X—X of FIG. 8.
Figure 10:
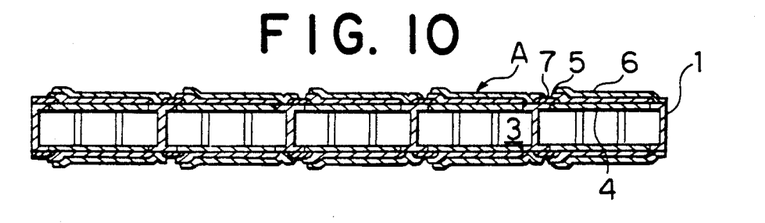
FIG. 10 is a cross-sectional view taken along line XI—XI of FIG. 8.

FIGS. 8, 9 and 10 schematically show a different-type fuel cell stack of this invention. In production, using alumina as a raw material, the dense substrate having a multiplicity of hollow portions is formed by extrusion pressing and then closed at one end of each hollow portion. Then at each hollow portion, a hole is made in which an inner electrode 4 is to be laid. On the substrate 1, a multiplicity of inner electrodes 4 are laid on each hole. A multiplicity of interconnections 7 are also formed on the substrate 1 in such a manner that each interconnection 7 extends between the adjacent single cells. In addition, an electrolyte 5 and an outer electrode 6 are laminated over each of the resulting single cells A so that the adjacent single cells are interconnected in series and in parallel to jointly provide a solid oxide fuel cell. Specifically, FIG. 9 shows the adjacent single cells interconnected in parallel, while FIG. 10 shows the adjacent single cells interconnected in series.

The arrangement of FIGS. 8, 9 and 10 can produce the same result as that of FIGS. 6 and 7. Further, by appropriate masking, it is possible to obtain a solid oxide fuel cell in which the adjacent single cells are interconnected both in parallel and in series simultaneously.

Figure 11A:
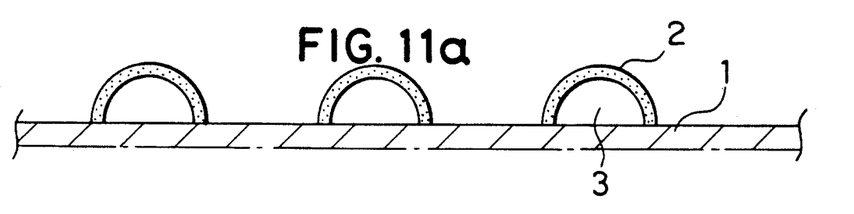
FIGS. 11(a) through 11(e) show the order of process steps in which a fuel cell is progressively manufactured according a method of the invention.

FIGS. 11(a) through 11(e) show a typical manufacturing method of this invention. First of all, as shown in FIG. 11(a), a multiplicity of porous support parts 2 to form a hollow portion 3 are arranged on the surface of the dense substrate 1 at equal distances. Although this process actually is carried out on each surface of the substrate 1, such process for the opposite surface is omitted from FIGS. 11(a) through 11(d) for clarity.

Figure 11B:
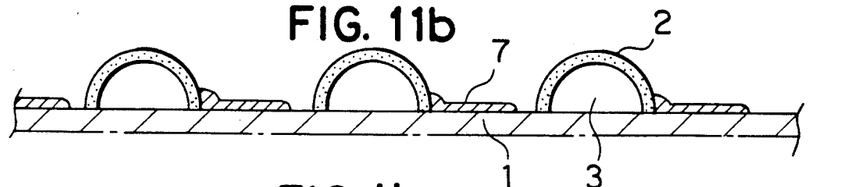
Figure 11C:
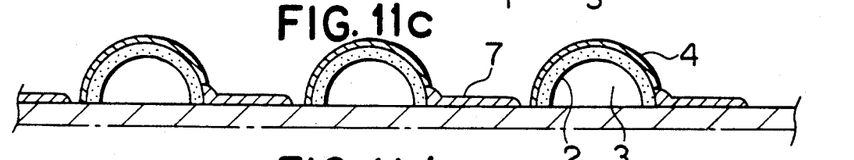
Figure 11D:
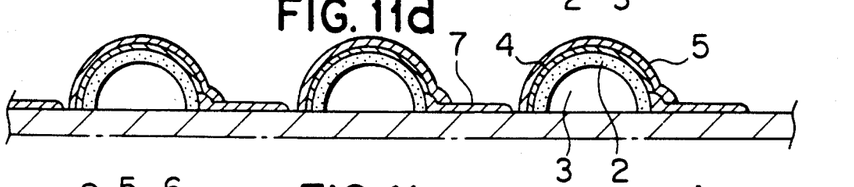
Figure 11E:
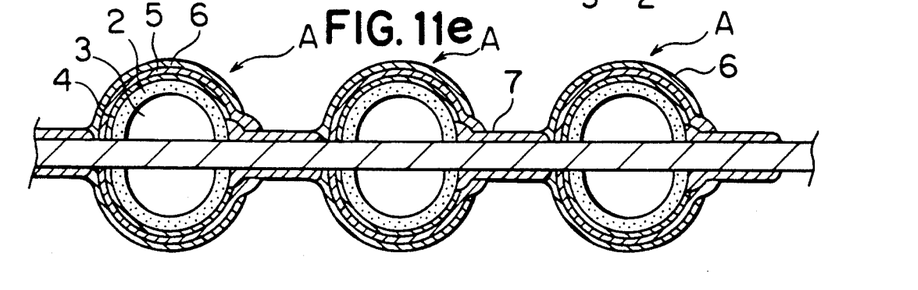

Then, as shown in FIG. 11(b), a multiplicity of interconnections 7 are formed on the substrate 1 in such a manner that each interconnection 7 extends from one end of the respective porous support part 2 toward and slightly short of the adjacent porous support part 2. FIG. 11(c) shows the inner electrodes 4 formed on the surface of each porous support part 2, while FIG. 11(d) shows the electrolyte 5 formed on the surface of the respective inner electrode 4 of FIG. 11(c). And FIG. 11(e) shows the outer electrodes 6 formed on the respective electrolyte 5. At this stage, the outer electrodes 6 are connected with each of the interconnections 7.

Thus the fuel cell of FIG. 1 has been obtained. Alternatively, the processes of FIGS. 11(a) through 11(c) may be carried out firstly on one surface of the subtrate and then the same processes may be done on the other surface.

Figure 12A:
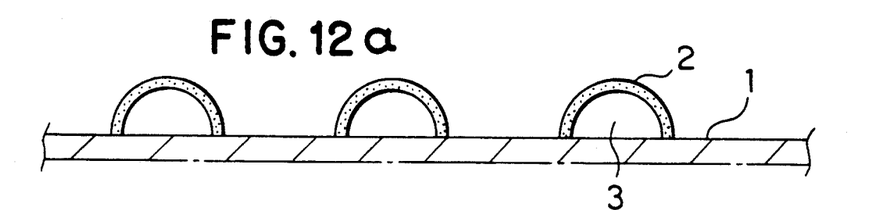
FIGS. 12(a) through 12(c) show the order of process steps in which a fuel cell is progressively manufactured according to another method of the invention.
Figure 12B:
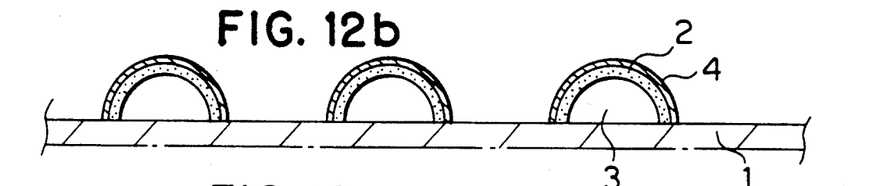
Figure 12C:
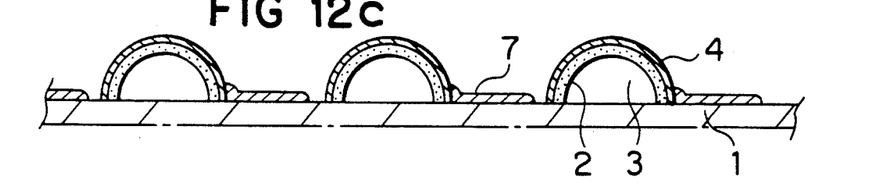

FIGS. 12(a) through 12(c) show a modification of the method of FIGS. 11(a) through 11(c). The individual inner electrodes 4, as shown in FIG. 12(b), is formed on the surface of each of the porous support parts 2 arranged at equal distances as shown in FIG. 12(a). Then, as shown in FIG. 12(c), a multiplicity of interconnections 7 are formed on the substrate in such a manner that each interconnection 7 extends from one end of the associated inner electrode 4 toward and slightly short of the adjacent inner electrode 4. The remaining processes are carried out in the same manner of FIGS. 11(d) and 11(e). As a result, the fuel cell stack of FIG. 1 has been produced.

According to this invention, since the single cells are supported by a substrate, it is possible to reduce the thickness of porous support part supporting the individual single cell or to get out of use the porous support part extremely so that gas supply to the electrolyte can be performed smoothly, thus improving the efficiency of generating electric power and also minimizing both the size and weight of the entire fuel cell stack. Further, since the individual single cells are connected on a common substrate in series and/or in parallel, it is possible to assemble the entire cell module simply by connecting these single cell stacks in parallel.

Furthermore, according to the manufacturing method of this invention, it is possible to manufacture the solid oxide fuel cell which causes the foregoing advantageous results.

What is claimed is:

1. A solid oxide fuel cell comprising:
   (a) a substrate which is dense in structure and gastight;
   (b) at least one hollow portion being formed between said substrate and porous support parts;
   (c) a multiplicity of single cells disposed on each of said hollow portions of said substrate, each of said single cells including confronting inner and outer electrodes with an electrolyte disposed between them; and
   (d) a multiplicity of interconnections connecting said single cells in series and/or in parallel on said substrate.

2. A solid oxide fuel cell according to claim 1, further including a multiplicity of porous support parts each disposed between an inner surface of each said single cell and the associated hollow portion.

3. A solid oxide fuel cell according to claim 1, wherein each said support part has a polygonal or semi-cylindrical contour and is disposed on said substrate, said hollow portion being defined by said substrate and said support part.

4. A solid oxide fuel cell according to claim 1, wherein said substrate has on its surface a groove over which said support part is disposed, said hollow portion being defined by said substrate and each said support part.

5. A solid oxide fuel cell acccording to claim 1, wherein said substrate has at a predetermined position on its surface a hole over which said support part is disposed, said hollow portion being defined by said substrate and each said support part.

6. A solid oxide fuel cell according to claim 1, wherein said support part is said inner electrode.

7. A solid oxide fuel cell according to claim 1, wherein said single cells are arranged on both surfaces of said substrate.

8. A solid oxide fuel cell according to claim 7, wherein said single cells are arranged on opposite surfaces of said substrate in mirror-image symmetry relative to said substrate.

9. A solid oxide fuel cell according to claim 7, wherein said single cells are arranged on opposite surfaces of said substrate in asymmetry relative to said substrate.

10. A solid oxide fuel cell according to claim 2, wherein each said hollow portion is defined by a recess in said substrate and each said porous support part received in a mouth of said recess.

11. A solid oxide fuel cell according to claim 10, wherein said recess has a step in the mouth of said recess, each said porous support part being supported on said step.

12. A method for manufacturing a solid oxide fuel cell, comprising the steps of:
   (a) providing a substrate having on its surface a multiplicity of hollow portions each with an inner electrode;
   (b) forming on said substrate a multiplicity of interconnections each extending from said inner electrode end to a position spaced a predetermined distance from an adjacent inner electrode to make each single cells in series;
   (c) forming an electrolyte on an outer surface of said inner electrode in each said hollow portion; and
   (d) then forming an outer electrode on an electrolyte in such a manner that said outer electrode is connected to each said interconnection of said adjacent single cell.

13. A method for manufacturing a solid oxide fuel cell, comprising the steps of:
   (a) providing a substrate having on its surface a multiplicity of hollow portions each with or without a porous support part;
   (b) forming an inner electrode over each of said hollow portions;
   (c) forming on said substrate a multiplicity of interconnections each extending from said inner electrode end to a position spaced a predetermined distance from an adjacent inner electrode to make single cells in series;
   (d) forming an electrolyte on an outer surface of said inner electrode in each said hollow portion; and
   (e) then forming an outer electrode on an electrolyte in such a manner that said outer electrode is connected to each said interconnection of the adjacent single cell.

14. A method for manufacturing a solid oxide fuel cell, comprising:
   (a) providing a substrate having on its surface a multiplicity of hollow portions each with or without a porous support part;
   (b) forming on said substrate a multiplicity of interconnections each extending from said porous support part end to a position spaced a predetermined distance from an adjacent porous support part to make said single cells in series;
   (c) forming an inner electrode over each of said hollow portions;
   (d) forming an electrolyte on an outer surface said inner electrode in each said hollow portion; and
   (e) then forming an outer electrode on an electrolyte in such a manner that said outer electrode is connected to each said interconnection of said adjacent single cell.

15. A method according to claim 12, further including the step of forming a multiplicity of interconnections connecting one said inner electrode end to adjacent inner electrode simultaneously with the forming step (b) to make said single cells in parallel.

16. A method according to claim 13, further including the step of forming a multiplicity of interconnections connecting one said inner electrode end to adjacent inner electrode simultaneously with the forming step (c) to make said single cells in parallel.

17. A method according to claim 14, further including the step of forming a multiplicity of interconnections connecting one said inner electrode end to adjacent inner electrode simultaneously with the forming step (c) to make said single cells in parallel.

* * * * *